Figure 11:
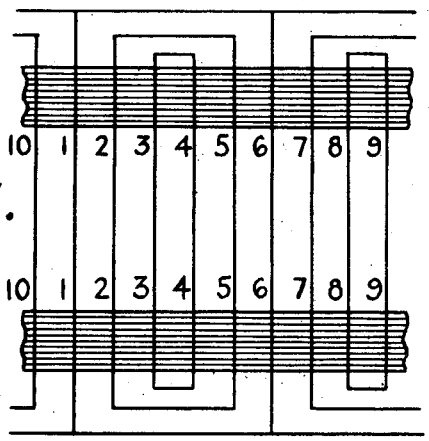

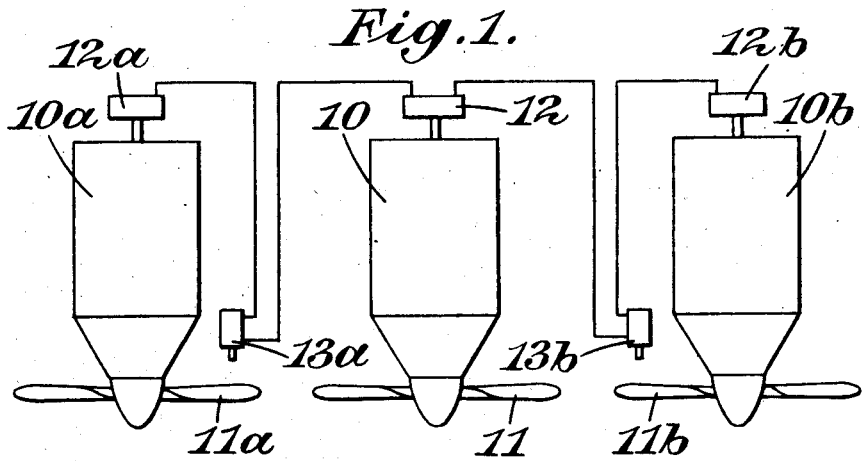
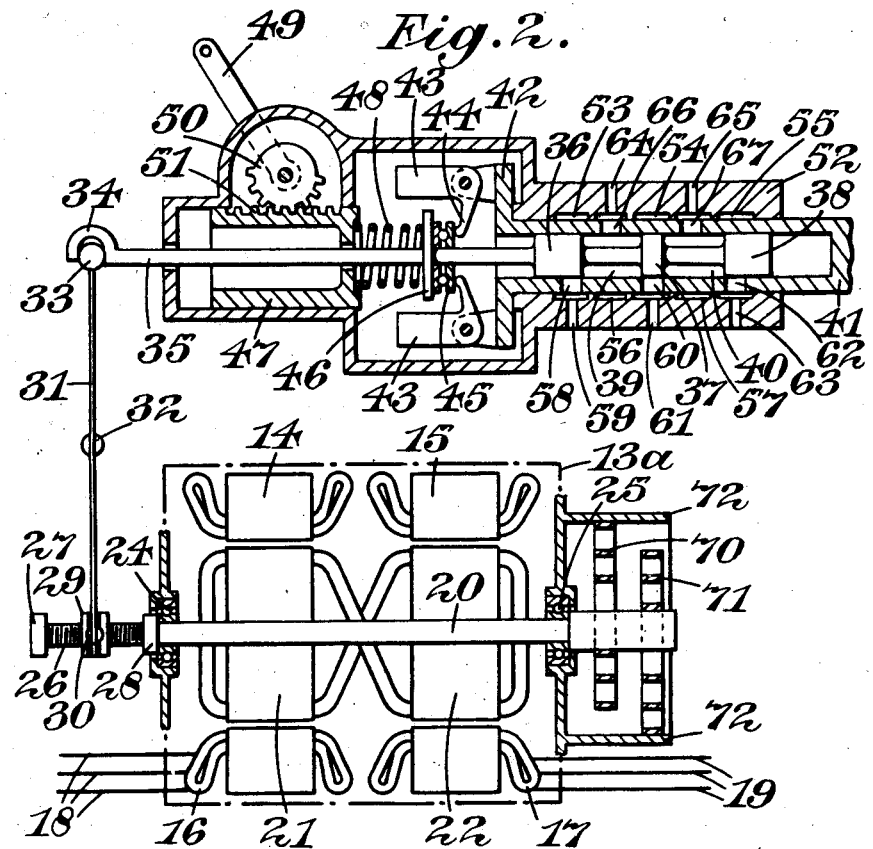

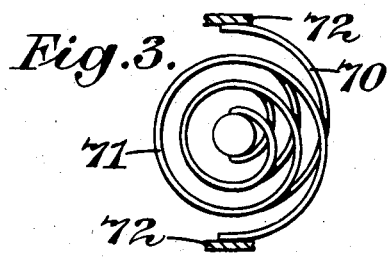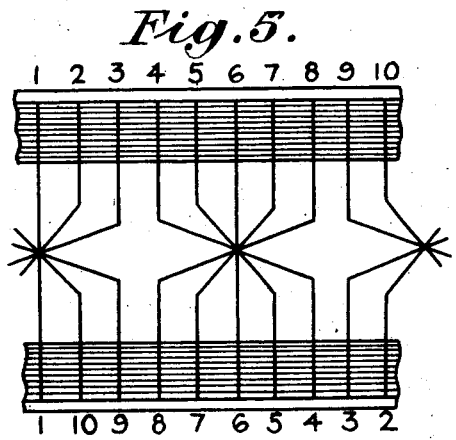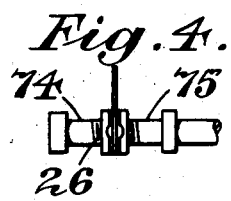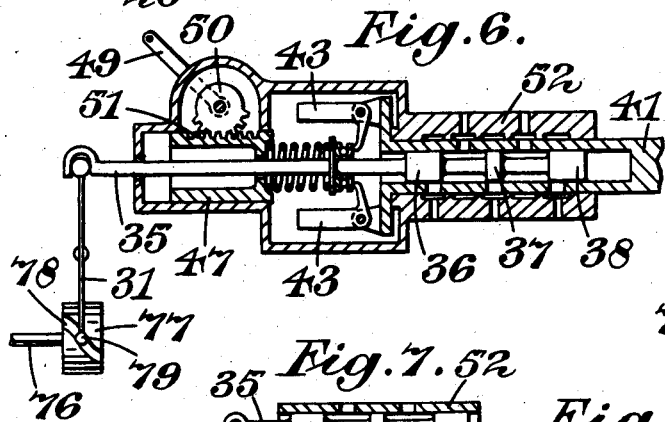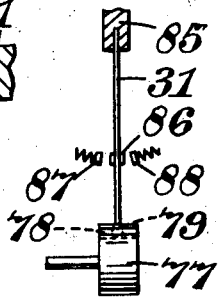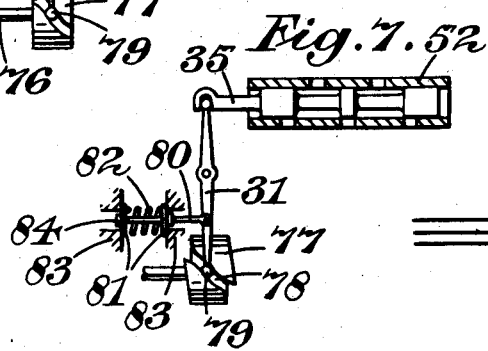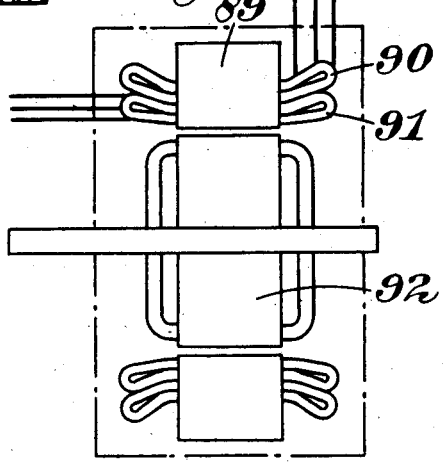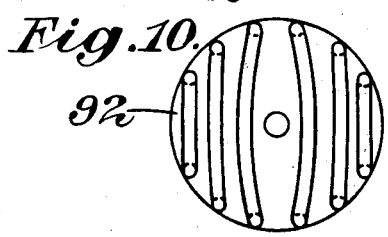

Sept. 15, 1942.　　　　　F. NEWTON　　　　　2,296,177
SYNCHRONIZING APPARATUS
Filed April 18, 1939　　　　3 Sheets-Sheet 3

Frederick Newton
by his attys.
Stebbins, Blenko + Parmelee

Patented Sept. 15, 1942

2,296,177

UNITED STATES PATENT OFFICE 2,296,177

SYNCHRONIZING APPARATUS

Frederick Newton, Derby, England

Application April 18, 1939, Serial No. 268,639
In Great Britain March 19, 1938

1 Claim. (Cl. 60—97)

This invention is for improvements in synchronising and speed-control devices such as may be used to synchronise the airscrews of a multi-engined aircraft. The primary object of the invention is the provision of a simple arrangement for ensuring that both or all of the airscrews (for example) shall rotate at the same speed. A further object is to ensure that the airscrews, in addition to merely rotating at the same speed, shall rotate in phase with one another; that is to say, at any instant the angular position of any airscrew shall be predetermined relatively to that of one of the others.

According to the invention, an aircraft comprises, in combination, an alternating-current generator of which the frequency is related to a datum-speed, an airscrew, an alternating-current generator of which the frequency is related to the speed of the airscrew, a dynamo-electric machine to which current from the two said generators is supplied and which responds to the frequency-difference between said generators and therefore to the difference between the speed of said airscrew and said datum-speed, and an operative connection between the said dynamo-electric machine and means for varying the speed of the airscrew in such sense as automatically to remove or reduce the said difference in speed. The first said generator is preferably driven by another engine of the same aircraft.

According to another feature of the invention, apparatus for maintaining one aircraft engine, driving a variable-pitch aircrew, in synchronism with another engine, driving another airscrew, comprises two alternating-current generators, each driven by one of said engines, a dynamo-electric machine to which the outputs of both said generators are supplied and which includes a rotor movable in accordance with the difference in frequency between the two said outputs, and a helical cam, screw-threaded member or the like driven by said rotor and co-operating with a tappet which controls, through a relay, the blade-pitch of the said variable-pitch airscrew in such sense as to tend to remove any difference between the speeds of the airscrews.

The dynamo-electric machine is preferably so connected to the generators as to produce two electro-magnetic fields rotating in opposite directions and comprises a single rotor so wound as to rotate at a speed corresponding to the difference in frequency between the two alternating currents.

Figure 12:
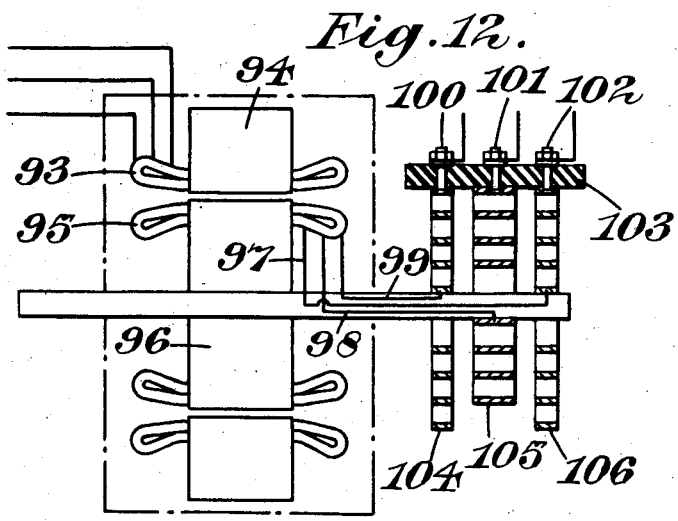
Figure 13:
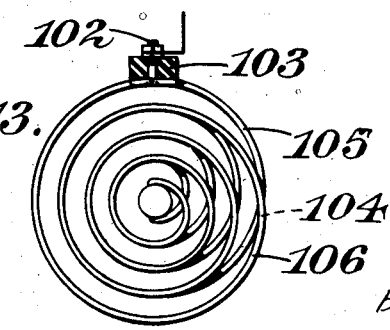

Specific embodiments of the invention will now be described, by way of example, with reference to the accompanying diagrammatic drawings of which:

Figure 1 is a diagram showing the manner in which three airscrew-driving engines of an aircraft may be kept in synchronism and, in some circumstances, in phase with one another, Figure 2 shows the dynamo-electric machine and hydraulic relay, Figure 3 is an end view of the dynamo-electric machine of Figure 2 showing means for restoring the rotor to a mean position, Figure 4 shows an alternative form of the screw-thread and tappet arrangement of Figure 2, Figure 5 is a diagram showing the manner in which the rotor of Figure 2 is wound, Figure 6 shows an alternative form of cam and tappet, Figure 7 shows an alternative arrangement in which there is no superimposed pilot's control, Figure 8 shows how the invention may be applied to an airscrew in which the blade-pitch is adjusted by an electric motor, Figures 9 and 10 show a form of dynamo-electric machine alternative to that shown in Figure 2, Figure 11 being a diagram of the rotor winding of Figures 9 and 10, Figure 12 shows yet another alternative form of dynamo-electric machine, Figure 13 being an end view showing the spiral conductors.

The invention will first be described with reference to an aircraft comprising a master engine 10 (Figure 1) driving an airscrew 11, and two other engines 10a, 10b driving airscrews 11a, 11b respectively; the engines 10a and 10b being maintained, by means of the invention, in synchronism with the engine 10. The engine 10 drives an alternating-current generator 12 and the engines 10a and 10b drive similar generators 12a and 12b, respectively. The outputs from the generators 12 and 12a are fed to a single dynamo-electric machine 13a which responds to any difference in the frequency of the two outputs and adjusts the pitch of the blades of the airscrew 11a in such manner as to vary the speed of the engine 10a, and therefore the driven-speed of the generator 12a, so as to remove the said frequency difference. In like manner the generators 12 and 12b feed a single dynamo-electric machine 13b, similar to the machine 13a, which is similarly operative to adjust the pitch of the blades 11b in such manner as to maintain the airscrew 11b in synchronism with the airscrew 11.

Each of the dynamo-electric machines 13a, 13b may be of the form which will now be described with reference to Figures 2 to 5. The machine 13a comprises stators 14, 15, the windings 16, 17 of which are connected by conductors 18, 19, respectively, to the generators 12 and 12a in such manner that the winding 16 generates a rotating field of which the frequency corresponds to the speed of rotation of the engine 10 and the winding 17 generates a field rotating in the opposite direction with a frequency depending upon the speed of rotation of the engine 10a. The rotor shaft 20 carries two rotor-elements 21, 22, each of which is wound in the manner shown diagrammatically in Figure 5; that is to say, each rotor element has two poles, five slots per pole and five phases, the windings on each rotor element being reversed with respect to the winding on the other rotor element, the windings being connected in common to end-rings. It will be seen that an oscillating flux common to both elements can only penetrate such a winding non-inductively at the diameter containing slots No. 1 and No. 6. The rotor shaft will therefore tend to take up a position in which the magnetic reluctance is a minimum and, in taking up this position, the rotor will rotate at a speed corresponding to half the difference (i. e., half the algebraic sum) of the speeds of rotation of the two rotating fields produced by the stator windings. By the use of a single differentially-operative dynamo-electric machine of this form no mechanical differential gear is required. The invention is distinguished, in this respect, from proposals including separate dynamo-electric machines each driving one element of a mechanical differential gear.

The rotor shaft 20, which may be supported in suitable bearings 24, 25, is extended at one end to form a screw-threaded portion 26 bounded at each end by bosses or flanges 27, 28. The screw-threaded portion is engaged by a nut-member or sleeve 29 which is formed with trunnions 30 for engagement by the forked end of a spring 31, the engagement being such that the nut 29 is restrained against rotation with respect to the rotor shaft; thus, rotation of the shaft 20 feeds the nut 29 along the screw-threaded portion 26 and thereby deflects the spring 31, which is pivoted at 32.

The other end of the spring 31 engages by a ball-joint 33 with the end 34 of a valve-rod 35 the other end of which is formed as a piston-valve comprising three lands 36, 37, 38, separated by grooves 39, 40. Surrounding the piston-valve is a sleeve 41 which is driven at its right-hand end by the engine 10a and which at its left-hand end carries a flange or plate 42 to which centrifugal masses 43 are pivoted. Each mass forms one arm of a bell-crank lever the other arm 44 of which engages, through the intermediary of a ball-bearing 45, a flange 46 secured to the valve-rod 35. The flange 46 is separated from a sleeve 47 by a compression spring 48 and the position of the sleeve, and therefore the loading of the spring, is controlled by a lever 49 carrying a toothed sector 50 to engage co-operating teeth 51 on the sleeve 47.

The sleeve 41 is surrounded by a ported housing 52 the internal wall of which is cut with grooves 53, 54, 55, 56, 57. The groove 53 registers with a port 58 in the sleeve 41 and with a drain-port 59 in the housing 52. The groove 54 similarly registers with a port 60 in the sleeve and a pressure-port 61 in the housing. The groove 55 registers with a port 62 in the sleeve and another drain-port 63 in the housing. The grooves 56 and 57 register with delivery ports 64, 65, respectively in the housing and with ports 66, 67, in the wall of the sleeve.

The delivery ports 64, 65, lead respectively to opposite ends of the cylinder of a reciprocating hydraulic motor the moving part of which is suitably interconnected with the roots of the blades of the variable-pitch airscrew 11a. Oil under pressure for actuating the motor is admitted to the port 61 in the housing. In the position of the valve shown, the hydraulic motor is cut off both from the supply port 61 and the drain-ports 59, 63, so that the blades are locked against pitch-varying movements. However, movement of the valve-rod 35 to the right will cause the land 37 to uncover the port 60 in the sleeve 41 whereby oil under pressure from the port 61 will flow around the groove 39, through the port 66 and groove 56 to the delivery port 64, whereby the motor will be driven in one direction. Oil discharged from the other end of the motor-cylinder will be drained through the port 65, groove 57, port 67, around the groove 40, through the port 62, groove 55 to the drain-port 63. Similarly, movement of the valve-rod to the left will cause the oil under pressure to be fed by way of the groove 40 to the port 65 and oil discharged from the hydraulic motor will be drained through the port 64 and groove 39 to the drain-port 59.

The apparatus shown in Figure 2 operates as follows: The pilot of the aircraft first adjusts the lever 49 so as to load the spring 48 to such an extent as will impose upon the centrifugal device 43 a range of movement such as will maintain the engine speed approximately at a desired value. Thus, any substantial departure of the engine speed, and therefore the speed of the sleeve 41, from the desired speed, will cause the masses 43 to move radially outwards against the load of the spring 48 or to be moved radially inwards by the spring 48. Such movements will move the flange 46, and therefore the valve-rod 35, from the position of equilibrium shown, whereby the pitch-varying motor will be actuated to change the pitch of the blades in such sense as to tend to restore the speed of the engine to the desired speed. A lever similar to the lever 49 appertains to each of the other engines on the aircraft. When the speeds of all the engines have been approximately adjusted in this manner the electrical synchronising gear is brought into operation by a suitable switch or other means, whereupon, should the engines not be in synchronism, the rotor shaft 20 will immediately be set in rotation with a speed proportional to the difference in speed between the engines 10 and 10a in the manner already described. Such rotation will move the nut 29 endwise along the screw-threaded portion 26. The spring 31 is loaded by such endwise movement of the nut, the loading of the spring 31 being superimposed upon the loading produced by the spring 48. Thus, endwise movement of the nut 29 will destroy the equilibrium of the piston-valve and will alter the pitch of the blades in such sense as to restore the speed of the engine 10a towards synchronism with the engine 10. The nut 29 will occupy a mean position in which there is minimum stress in the lever 31 only when the engine 10a is rotating in synchronism with the engine 10.

It is evident that there will be a time interval between the movement of the nut 29 along the screw-threads and the consequent change in the blade-pitch. Thus, where there is a wide discrepancy between the speeds of the engines, the nut will travel to one end or the other of the screw-threaded portion 26 and engage the flange 27 or 28. Such engagement will mechanically arrest the movement of the rotor shaft 20 until the speed of the engine 10a has been corrected, whereupon the rotor will reverse and restore the nut 29 to an intermediate position. The spring 31 must be capable of exerting a force sufficient to compensate for the wide initial discrepancy referred to.

It is desirable that the nut 29 should be restored to a mean position on the screw-threaded portion 26 when the generators 12, 12a are inoperative upon the dynamo-electric machine 13a. For this purpose there may be affixed to the right-hand end of the rotor shaft 20, as shown in Figure 2, two spiral springs 70, 71, each anchored to a fixed part 72 and tending to rotate the shaft in opposite directions. Rotation of the shaft in one direction loads the spring 70 and rotation in the other direction loads the spring 71. Thus, when the electrical system is switched off, or the engines stopped after the aircraft has landed, the effect of the springs 70, 71, will be to restore the rotor to a mean position in which the nut 29 occupies a predetermined position with respect to the screw-threaded portion 26.

Where the dynamo-electric machine 13a exerts a considerable torque on the rotor for non-synchronous conditions of the engines, it may be preferable to form the left-hand end of the rotor shaft as shown in Figure 4 in which the screw-threaded portion 26 is formed on each side with plain portions 74, 75. When the engines are out of synchronism, the nut 29 moves along the screw-threaded portion 26, and passes out of engagement with the screw-threads on to the plain portion 74 or 75, whereupon endwise movement of the nut-member in that direction ceases. Means must be provided for pressing the nut-member 29 towards its position for engagement with the screw-threads, such means being described below with reference to Figure 7.

The pitch and number of the screw-threads will be determined according to the range of movement of the nut-member required. The necessity for the spiral springs 70 and 71 may be obviated my making the interconnection between the nut 29 and the shaft 20 of a reversible nature. For example, the screw-threads 26 may be replaced by helical splines of such quick pitch that the bending load in the spring-lever 31 will restore the nut 29 to a predetermined position, by rotating the shaft 20, when the electric circuit is disengaged or the engines stalled. Should the provision of quick pitch splines necessitate an unduly long extension from the shaft 20, the splines may be formed on a shaft which is geared to the shaft 20 by toothed gearing of a reversible character.

Instead of a screw-threaded member for imparting movement to the tappet-arm 31, the arrangement shown in Figure 6 may be used in which the dynamo-electric machine (not shown) drives a shaft 76 carrying a drum 77 in the surface of which a helical slot 78 is cut. A tappet-member 79 on the end of the spring-lever 31 engages the slot and controls the movement of the valve-rod 35 in the manner already described. In the arrangement of Figure 6 there is preferably a substantial clearance between the tappet-member 79 and the walls of the slot 78 to prevent an unduly sensitive action of the mecha- nism from leading to hunting. The arrangement shown will maintain the two engines not only in synchronism with one another but also in accurate phase relationship. If the engines are correctly in phase with one another the tappet occupies a mean position as shown in Figure 6. Should the airscrew 11a depart from this correct phase relationship with the airscrew 11, the dynamo-electric machine will rotate the shaft 76 whereby the tappet will be driven towards one end or the other of the slot 76 and the hydraulic valve will be adjusted so as to vary the pitch of the blades 11a in such sense as to restore the correct phase relationship. So long as the airscrews 11a and 11 are out of phase, the tappet 79 will tend to be thrust out at one end or other of the slot 78 and the drum 77 will rotate without moving the tappet further in the same direction. When, and only when, the airscrew 11a approaches the correct phase relationship with the airscrew 11, the drum 77 will slowly reverse its direction of rotation whereby the tappet 79 will be fed back into the slot. The tappet 79 may be restored to a mean position by the resiliency of the lever 31, or, alternatively, the lever 31 may be made rigid, separate restoring means being provided as in Figure 7, described below.

In some circumstances the speed-responsive centrifugal device 43 of Figures 2 and 6 is not required and no manual control from the pilot is necessary. In such circumstances the hydraulic valve-rod 35 may be controlled solely by means of a rigid lever or tappet-arm 31 (Figure 7) of which the tappet-member 79 engages the slot 78 in the drum 77. The valve controls the ports 59, 61, 63, 64, 65, in a fixed housing 52 with or without the intermediary of the rotating sleeve 41 of Figure 2. To ensure that the tappet 79 shall be fed back into the slot 78 from its displaced position, when the drum reverses its rotation, a rod 80 may be pivoted to the lever 31, the rod being loosely engaged by washers 81 separated by a spring 82 and each engaging an abutment 83. The rod is formed with two flanges 84 each engaging one of the washers so that, when the tappet 79 swings to the left, the right-hand washer compresses the spring 82 and leaves its abutment and when the tappet moves to the right the left-hand washer compresses the spring; thus, the spring 82 tends to restore the tappet to its mean position in whichever direction it has been moved.

The centering arrangement illustrated in Figure 7 may also be applied with advantage to the form of apparatus illustrated in Figure 2. In an alternative form of the invention, the lever 31 may be rigid and its fulcrum may be constituted by the end of the rod 82. To ensure re-engagement by the groove 78 of the tappet 79 the edges of the drum 77 are preferably of helical form as shown.

In the examples described above, the variable-pitch mechanism comprises a reciprocating hydraulic motor for effecting the pitch-varying movements. In an alternative form of the invention the pitch-varying motor may be an electric motor the circuit of which is controlled by a switch operated by the lever arm 31 as shown in Figure 8 in which the tappet 79 is engaged by the groove 78 in the drum 77 as before, but instead of being connected to the hydraulic valve-rod 35 is anchored at one end 85 and carries at a point in its length a contact 86 adapted to engage either the contact 87 or the contact 88 upon being deflected from a mean position or range of positions. When the contact 86 engages the contact 87, the pitch-varying motor is energised so as to rotate in one direction, and when the contact 86 engages the other contact 88 the motor is energised so as to rotate in the other direction.

The invention may also be applied to the type of variable-pitch airscrew in which the blades are moved in one direction by hydraulic pressure and in the other direction by a constantly-acting opposing force, such as the pressure of a spring.

An alternative form of the dynamo-electric machine 13a is shown in Figures 9, 10 and 11 in which a single stator member 89 is furnished with two windings 90, 91, one of which is supplied with alternating current from the generator 12 of the master engine 10 and the other of which is supplied with alternating current from the generator 12a of one of the other engines. The rotor element 92 is wound in the manner shown in Figures 10 and 11 in which, in a two pole arrangement, there are five slots per pole and five phases, each winding being closed on itself as shown in Figure 11.

Another possible form of dynamo-electric machine is shown in Figure 12 in which alternating current from the master engine-generator 12 is supplied to the winding 93 of the stator 94 and current from the generator 12a of the other engine is supplied to the winding 95 of the rotor element 96 so as to produce two fields rotating in the same direction. In order to avoid a broken circuit, the conductors 97, 98, 99, leading to the winding 95 of the rotor element are connected respectively to terminals 100, 101, 102, mounted on an insulatingg panel 103, through spiral springs 104, 105, 106. These springs not only serve as conductors but also act to restore the rotor to a mean position in the same manner as the springs 70, 71, of Figure 2. The spring 105, for example, may be of opposite hand to the springs 104, 106, and is preferably of a stiffness equal to the combined stiffness of the other two springs.

In each form of the dynamo-electric machine above described it will be seen that no sliprings, brushes or the equivalents are used so that each circuit is unbroken; thus no sparking, which might give rise to risk of fire and interference, can occur.

The levers 49 (Figure 2) by which the pilot adjusts the approximate speeds of the several airscrews may, in one form of the invention, be all connected together through adjustable couplings in such manner that the desired approximate speeds of the airscrews may be obtained by the operation of a single lever. With such an interconnection, however, it is desirable to superimpose control-means whereby each lever may be individually operated as desired so as to facilitate, for example, the manoeuvring of a water-borne flying boat.

Also, means may be provided for cancelling the effect of the centrifugal device upon the piston-valve when the electrical synchronising gear is brought into action. For example, the flange 46 might be declutched from the valve-rod 35 so that the valve or other relay would then be under the sole control of the dynamo-electric machine.

Alternatively, there could be two piston-valves, one controlled by the centrifugal device alone and the other controlled by the dynamo-electric machine alone; by means of a change-over valve either one or the other of said piston-valves could be brought into operation.

In Figure 1 the engine 10 is shown as the master engine, with which the other engines 10a and 10b are to be synchronised. But it is preferable to equip each engine with a dynamo-electric machine 13 and to provide a switching arrangement whereby (1) any one of the engines may, at will, be selected as the master engine with respect to which the others will be automatically synchronised, the dynamo-electric machine on the master engine being switched out of action, and (2) the electrical synchronising gear may be rendered entirely inoperative.

Instead of an arrangement in which one or more airscrews are synchronised with reference to master engine, the invention may provide an arrangement in which all the airscrews on an aircraft are synchronised with a machine, other than an airscrew-driving engine, such as an electric motor continuously driven at a datum-speed, or an auxiliary engine such as may be used to drive auxiliary apparatus on the aircraft. Such an electric motor or engine would drive an alternating-current generator supplying each of the dynamo-electric machines 13, each such machine being also supplied with alternating current from a generator driven by the engine to which it appertains.

I claim:

Apparatus for maintaining synchronism between two rotary machines, such as two engines of an aircraft, comprising an alternating-current generator driven by one machine and another alternating-current generator driven by the other machine, a single dynamo-electric machine supplied with current from the said generators so as to produce two electro-magnetic fields rotating in opposite directions and a rotor so wound as to rotate at a speed corresponding to the difference in frequency between the two alternating currents, means for regulating the speed of one of the machines, a lever resiliently connecting the speed regulating means with the rotor so as to tend to restore the machine to synchronism with the other upon rotation of the rotor, and a manually operated control including resilient means for setting the speed regulating means so that the machines are in approximate synchronism whereupon further regulation is accomplished by rotation of the rotor.

FREDERICK NEWTON.